United States Patent

Wuenscher, deceased et al.

[11] 4,411,632
[45] Oct. 25, 1983

[54] WATERBOUND FACILITY POWERED BY CYCLOIDAL FLUID FLOW ENGINES

[76] Inventors: Hans F. Wuenscher, deceased, late of Huntsville, Ala.; Hertha A. Wuenscher, administratrix, 2004 Dogwood La., Huntsville, Ala. 35810

[21] Appl. No.: 266,848

[22] Filed: May 26, 1981

Related U.S. Application Data

[63] Continuation-in-part of Ser. No. 919,811, Jun. 28, 1978, abandoned, which is a continuation of Ser. No. 777,532, Mar. 14, 1977, abandoned.

[51] Int. Cl.³ ............................................. B63H 5/00
[52] U.S. Cl. ........................................ 440/93; 290/54
[58] Field of Search ............................. 440/89, 93, 54; 290/42–44, 53–55; 416/98, 101, 108

[56] References Cited

U.S. PATENT DOCUMENTS

| | | | |
|---|---|---|---|
| 3,928,771 | 12/1975 | Straumsnes | 290/54 |
| 3,978,345 | 8/1976 | Bailey | 290/54 |
| 4,163,905 | 8/1979 | Davison | 290/54 |

Primary Examiner—Sherman D. Basinger
Assistant Examiner—Jesus D. Sotelo

[57] ABSTRACT

A waterbound facility, serving the extraction of energy from the water current in which it is moored, consists of a seaworthy vessel, which carries cycloidal turbines, extending their impeller blade assemblies through the vessels bottom into the current. Deployable shrouding, guide vanes and underwater sails serve the concentration of flow. Retractability of turbines and ballast tanks provide draft control for entering harbors.

5 Claims, 7 Drawing Figures

WATERBOUND FACILITY POWERED BY CYCLOIDAL FLUID FLOW ENGINES

Cross-Reference to Related Applications

This is a continuation-in-part of Ser. No. 919,811 filed 6/28/78 which was a continuation of Ser. No. 777,532 filed 3/14/77, both now abandoned.

BACKGROUND OF THE INVENTION.

1. Field of the Invention.

This invention relates to waterbound facilities serving the extraction of energy from the water current in which it is moored, and using it for powering the production machinery on board. It is an object of this invention to apply the advantages of cycloidal turbines having blade assemblies of aircraft type wing and tail configuration, being pitch controlled by reciprocating tail surfaces through the full range of advance ratios, as in detail described in my invention Ser. No. 906,879 "Cycloidal Fluid Flow Engine", now U.S. Pat. No. 4,247,251 for achieving new and useful improvements in floating facilities utilizing the low density energy of ocean currents.

To further develop the extraction of useful energy from ocean currents, by allowing a floating power system to follow a captive path to increase the relative fluid velocity, the patent application titled "Captive Water Current Power System" Ser. No. 206185 was filed on 11/12/80.

Further refinements of the "Cycloidal Fluid Flow Engine" patented in Pat. No. 4,247,251 are pending per patent application Ser. No. 185502 titled "Alternating Lift Wing System" filed on 09/09/80.

2. Description of the Prior Art.

It is known that many ocean currents have huge amounts of energy, for instance the Gulf Stream along Florida has about 25 million KW of kinetic energy. However, the prior art did not reach any useful solutions for extracting this energy, because of its incompatibility with the low energy density in such current in concert with the corrosive environment and sometimes extreme storm conditions.

SUMMARY OF THE INVENTION.

The broad objective of my invention is to provide a power producing facility capable of using the hitherto unused clean energy of water currents, without resorting to dams and reservoirs of enormous cost and environmental impact.

A specific objective of the invention is to achieve efficient and safe operation by combining cycloidal turbines in general and specifically such turbines having blade assemblies of wing and tail configuration and being pitch controlled by reciprocating tail surfaces through the full range of advance ratios, with seaworthy vessels.

Another objective of the invention is the self-contained conversion capability of the facility, from a seagoing ship to a power producing waterbound facility and vise versa, capable of reaching sheltered harbour in case of upcoming extreme weather.

A further objective of the invention is the multipurpose use of guide vanes; for concentrating the water current through the turbines; serving at the same time as outriggers carrying roll compensating tanks; and serving also for shrouding the flow channels in the ships body, during transfer of the facility. Another objective of the invention is the employment of under water sails using the mooring cables for rigging, for enhancing the flow through the turbines.

Another objective of the invention is to provide draft control of the vessel by ballast tanks and also rectractable arrangement of the turbines in order to enhance maneuverability and maintainability of the facility.

DETAILED DESCRIPTION OF THE DRAWINGS

Figure 1:
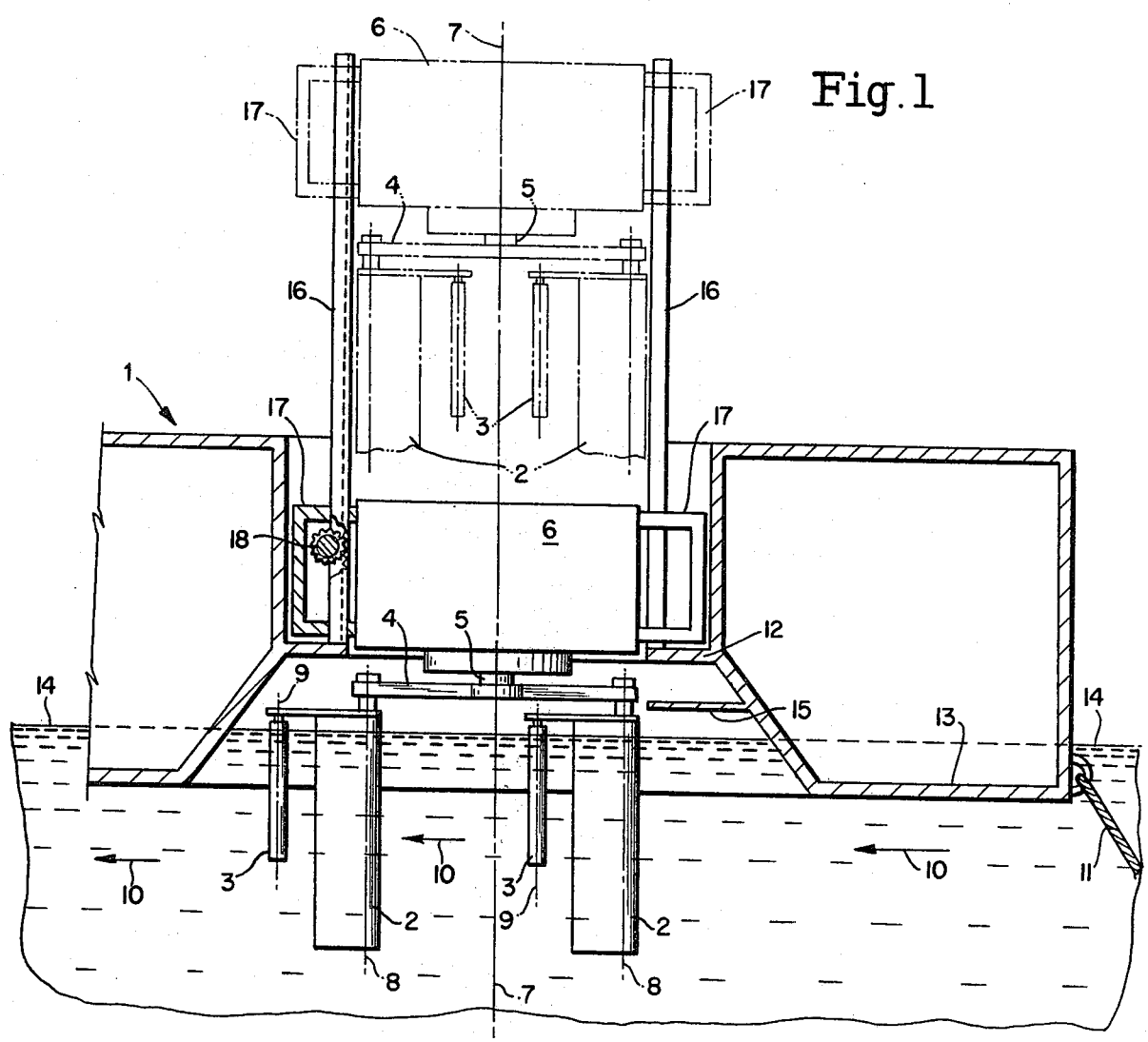
FIG. 1 illustrates a vertical cross section through a waterbound facility carrying a retractable cycloidal water turbine.
Figure 7:
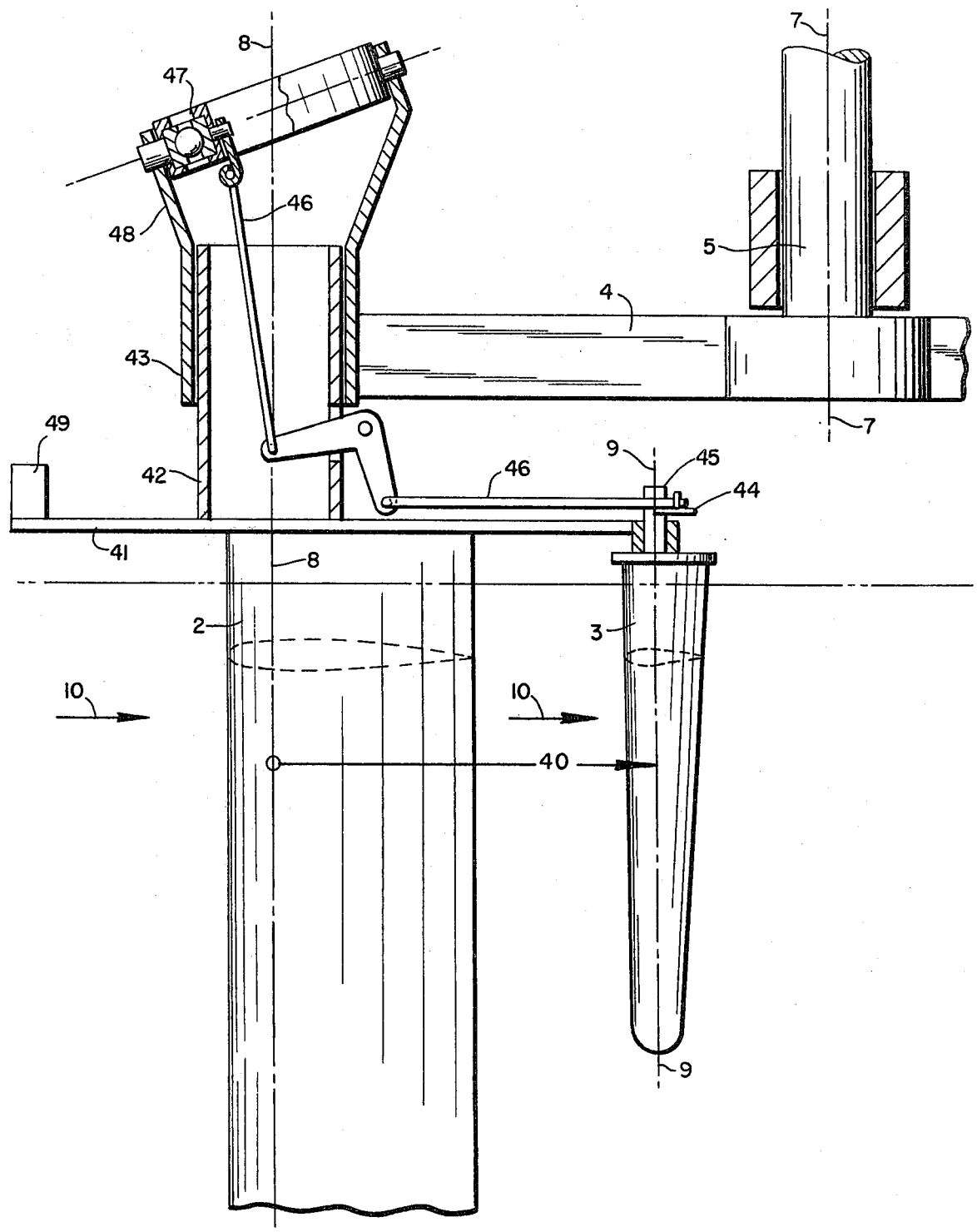
FIG. 7 illustrates the control means for pitch adjustment of the impeller blade assemblies.

In FIG. 1, a floating facility represented at 1, carries a cycloidal water turbine, consisting of impeller blade assemblies having wings 2 with tail surfaces 3 carried by radial structure 4 and the mainshaft 5, forming an integrated power unit with the production machinery indicated at 6. Said impeller blade assemblies rotate about mainshaft axis 7—7, said wings are rotably mounted about axis 8—8 to said radial structure, said tail surfaces reciprocate about axis 9—9, effecting proper pitch control for producing efficient torque in said mainshaft from the flow interacting with the water current indicated by arrows 10, in which said facility is moored by means of anchor line 11. Said water turbine achieves the specific pitching pattern for each said impeller blade assemblies as required for proper operation of cycloidal fluid flow engines by having control means effecting said tail surfaces 3 to reciprocate once during each revolution of said mainshaft 5, and by utilizing established aircraft practice for accomplishing satisfactory pitch controllability and damping by locating the tail more than one wing depth downstream, as indicated in FIG. 7 by tail leverarm 40. Pitch control stability is achieved by locating the rotary axis 8—8 in said wing forward of the center of pressure of said blade assembly. In FIG. 7, a preferred embodiment of said control means consists of an inclined bearing device indicated at 47. A fuselage member 41 connects wing 2 with tail 3 and the hollow hubshaft 42, said hubshaft providing a freely rotable support in hub 43 fixed to radial structure 4. A counterweight 49 serves the balance about axis 8—8. The resultant flow 10 will align said blade assembly to zero lift position, but any angular deflection of tail surface 3 will turn said wing to a corresponding angle of attack. Crank 44 extending from hinge shaft 45 is connected by linkage 46 to the inner ring of said inclined bearing device 47, forcing said inner ring to rotate with said blade assembly following the cyclical changing of said resultant flow. The outer ring of said inclined bearing device is fixed to said radial structure by inclination mount 48, maintaining said axis inclined about wing axis 8—8. The relative rotational position between said inner and outer rings, reflecting the rotational position between said radial structure 4 and said impeller blade assembly, and in concert with the inclination of said bearing effects reciprocation of said tail, thus providing pitch control and proper cyclical variations of the angle of attack of cycloidal impeller blades.

Explaining the operation more in detail: FIG. 7 illustrates the windward position of said blade assembly, the linkage attachment at the inner ring is in downward position, deflecting the tail and turning the wing to maximum angle of attack. In leeward position the opposite angle of attack is produced, while during the sideways passage the transition through zero angle of attack happens. The blade sees and responds only to the resultant flow 10, composed of the current and the circumferential speed. As long as the latter is smaller, the blades are all the time facing into the current, pitching in a fishtailing pattern. Otherwise they reciprocate about a tangential position. At such higher than the current circumferential speed, smaller impellers with fewer blades are needed for the same performance, being economically more efficient. My new cycloidal turbine is capable of performing at all speed ratios, while all other known cycloidal turbines can either not exceed the current speed or can not start on their own power. In FIG. 1, said turbine is mounted to a recessed bottom area 12, above the submerged bottom 13 of the hull, which forms the floating support structure of said facility, in order to maintain all structural and moveable turbine systems above water level 14, with exception of said wings and tail surfaces required to be in contact with the current. A shield as indicated at 15 protects against water spray. Said integrated power unit is retractably mounted to guiderails 16 by means of guide shoes 17 and moved to different positions by rack and pinion drives or hydraulic systems as indicated at 18. In retracted position the blades are shown rotated with their tail towards center line 7—7, providing for a smaller passage inside the hull.

Figure 2:
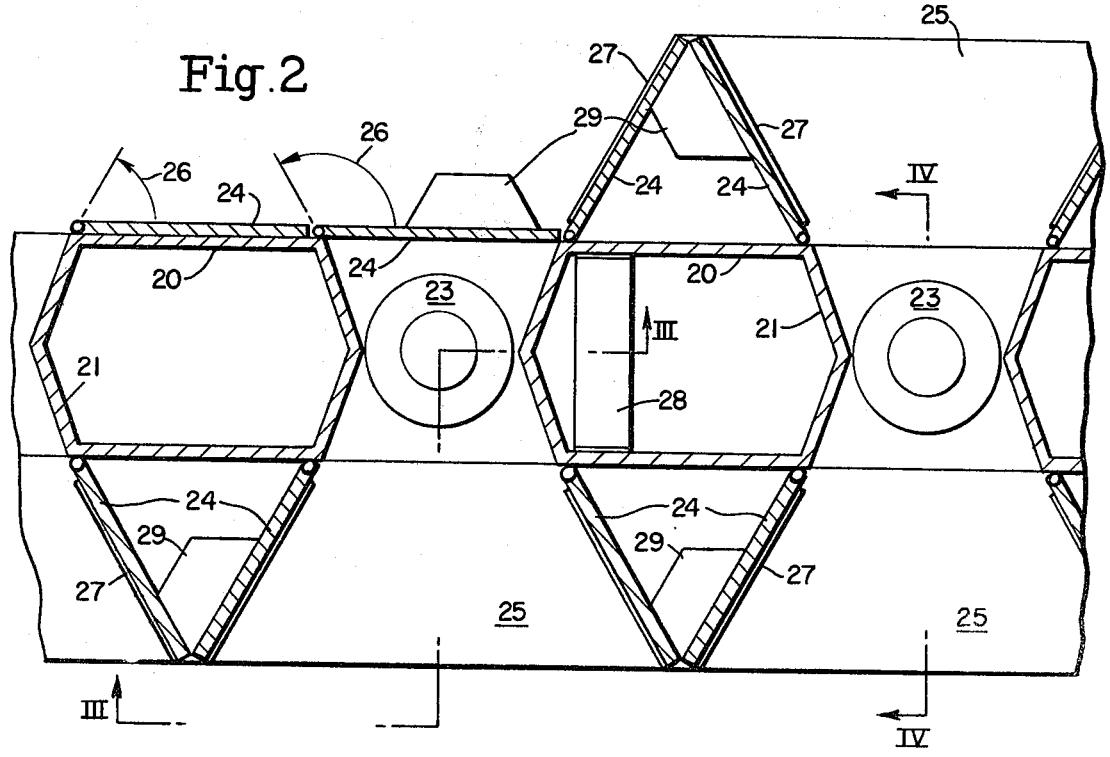
FIG. 2 shows a horizontal cross section through the facility at the waterline, looking downward into the flow channels between the hull segments and guide vanes.
Figure 3:
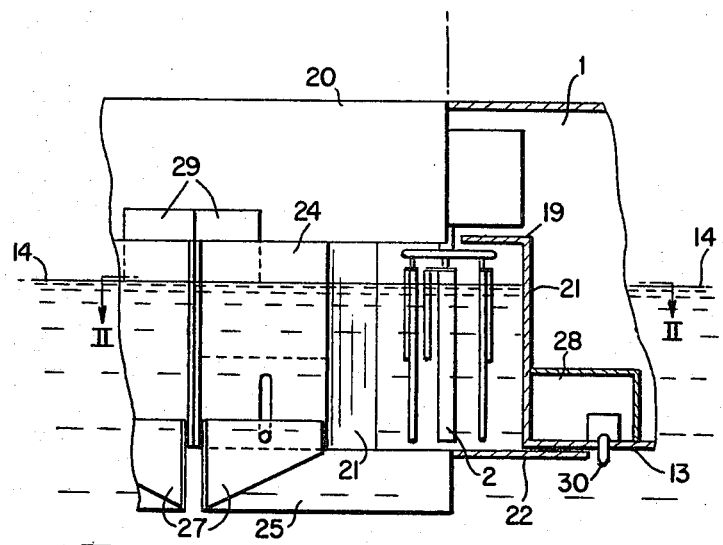
FIG. 3 is a side view of a part of the facility illustrating a flow channel to a turbine and the guide vane extensions.
Figure 4:
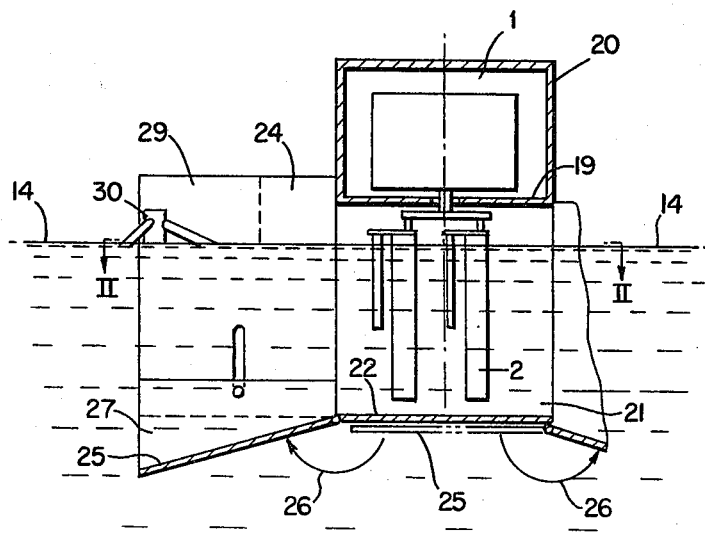
FIG. 4 is a cross section to FIG. 3.

In FIGS. 2,3,4 said recessed bottom areas indicated at 19, extend from one side of said hull to the other side, indicated at 20, forming flow channels with tapered side walls 21 and a bottom plate 22, effecting an increase in flow speed through the impeller area 23 orbited by said wings 2. Vertical guide vanes 24 are stored along side walls 20 of the hull, and horizontal guide vanes along bottom plate 22, thereby also covering the channel openings in the side walls and bottom. Said guide vanes are deployed to positions indicated by arrows 26, extending said channel openings in said hull to form inlet and outlet nozzles overlapping the entire submerged area of said facility. Slides 27 are used to close gaps along the inclined horizontal guide vanes 25. Water ballast tanks 28, roll compensation tanks 29 and pump systems indicated at 30 serving the fill, drain and recirculation of water ballast for draft control and for roll damping of said facility. The roll compensation tanks 29 are at the upper outer ends of vertical guide vanes 24, acting like floats on outriggers. Tanks 29 do not interfere with the vessels motion during transfer, when said vertical guide vanes are folded against said hull, because these tanks extend free from the water line upward.

Figure 5:
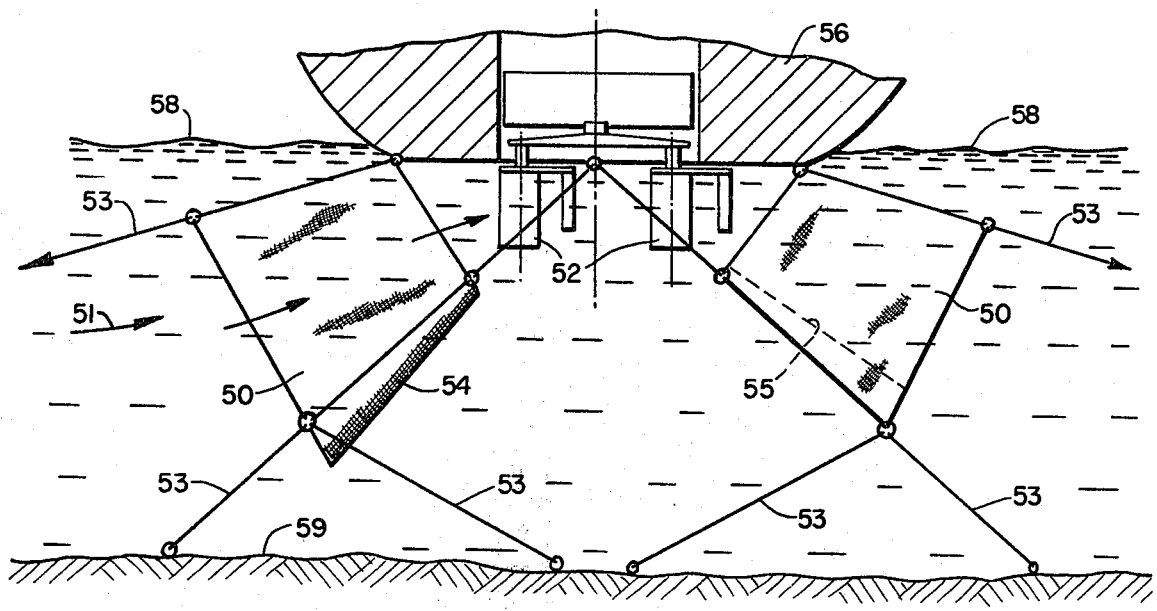
FIG. 5 shows a side view of the arrangement of under water sails attached to mooring cables.
Figure 6:
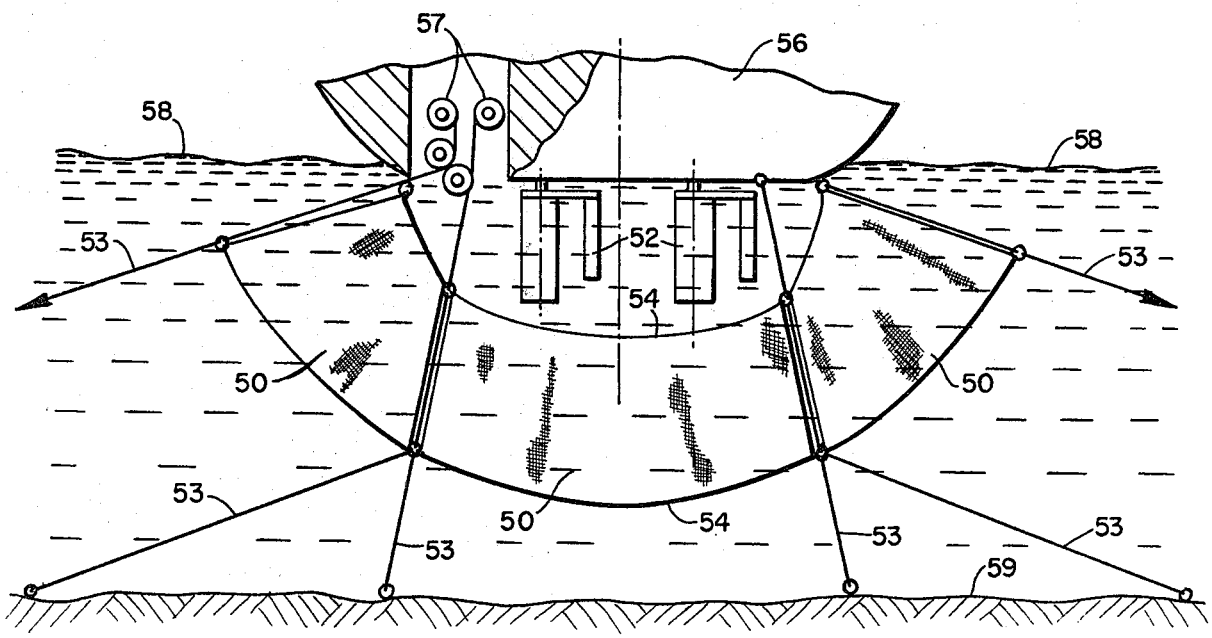
FIG. 6 is a front view of FIG. 5.

FIG. 5 shows a side view and FIG. 6 a front view of the arrangement of under water sails 50, used for guiding the water current 51 in order to increase the velocity of the flow through turbine 52. The sails are deployed between mooring cables 53 and could be made from wire, glass or plastic fiber reinforced cloth and bulge under the flow of the water as indicated by lines 54 and 55. The mooring cables 53 extend from facility 56. The cables are deployed from anchor winches 57, which are preferably mounted above the water line in a passage in structure 56. The drums of the winches provide equal tension on the mooring cables independent of fluctuations of the water level by means for example of a wound up leaf spring. The sails 50 are deployable from suitable platforms above the water line, by unsing lead in cables, sail-tracks and slides as commonly practices for setting and reefing sails.

Obviously, many modifications and variations of the present invention are possible in the light of the above teachings. It is therefore to be understood that, within the scope of the appended claims, the invention may be practiced otherwise than as specifically described.

I claim:

1. A waterbound facility comprising:
   a floating facility having its production machinery powered by cycloidal fluid flow engines with impeller blade assemblies of aerodynamic wing and tail configuration, wherein each said cycloidal fluid flow engine comprises:
   a vertical mainshaft having disclike radial structure extending from its lower end;
   a number of impeller blade assemblies,
   each assembly being mounted at equal peripheral spacing to said radial structure,
   each blade assembly rotatable freely about its axis, and
   each assembly being composed of a wing and a tail, and
   each assembly having the axis of rotation parallel to said mainshaft and extending downward from said radial structure, and
   each assembly having a tail surface reciprocating once during each revolution of said mainshaft effecting pitch control for said blade assemblies, and control means effecting said tail surface reciprocation as a function of the relative rotational position between said radial structure and said blade assemblies;
   means for mooring said facility in a water current;
   means for transmitting the shaft power of said engines to said machinery.

2. A waterbound facility according to claim 1, wherein said floating facility has areas of its bottom recessed above the water level, providing for dry mounting means for each of said engines.

3. A waterbound facility according to claim 2, wherein said mounting means at each recessed bottom area provide for vertically movable attachment means for positioning said engines in retracted and in working condition.

4. A waterbound facility according to claim 3, wherein said recessed bottom areas have openings for letting said impeller blade assemblies pass through into the free water current below said facility, keeping all other structural systems of said engines above water level.

5. A waterbound facility according to claim 4 where said recessed bottom areas form an inlet and outlet nozzle.

* * * * *